(12) United States Patent
Iizuka et al.

(10) Patent No.: US 6,372,070 B1
(45) Date of Patent: Apr. 16, 2002

(54) PROCESS AND APPARATUS FOR LAYING RUBBER MATERIALS FOR TIRE-CONSTITUTIONAL MEMBERS

(75) Inventors: Shuhei Iizuka, Kodaira; Yuichiro Ogawa, Fuchu, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/327,613

(22) Filed: Jun. 8, 1999

(30) Foreign Application Priority Data

Jun. 29, 1998 (JP) .......................................... 10-181789
May 18, 1999 (JP) .......................................... 11-136634

(51) Int. Cl.$^7$ .............................................. B29D 30/62
(52) U.S. Cl. ........................ 156/117; 156/130; 156/397
(58) Field of Search ................................ 156/117, 397, 156/130, 184, 189, 244.11; 425/327, 141

(56) References Cited

U.S. PATENT DOCUMENTS

| | | | | |
|---|---|---|---|---|
| RE25,349 E | * | 3/1963 | Hanson | 156/117 |
| 3,975,126 A | * | 8/1976 | Wireman et al. | 425/141 |
| 4,155,789 A | * | 5/1979 | Wireman et al. | 156/130 |
| 4,963,207 A | * | 10/1990 | Laurent | 156/117 |

FOREIGN PATENT DOCUMENTS

| | | |
|---|---|---|
| DE | 3405931 A1 | 8/1985 |
| EP | 0 264 600 A1 | 4/1988 |
| EP | 0 528 683 A1 | 2/1993 |
| JP | 61 037422 A | 2/1986 |
| JP | B-7-94155 | 10/1995 |

* cited by examiner

Primary Examiner—Geoffrey L. Knable
(74) Attorney, Agent, or Firm—Oliff & Berridge, PLC

(57) ABSTRACT

A rubber material for tire-constitutional member is laid on a rotating support at a high efficiency and a high accuracy by arranging a pair of rollers rotating in opposite directions in the vicinity of a radially outer surface portion of the support and utilizing a gap defined between the rollers as a roller die.

9 Claims, 6 Drawing Sheets

PROCESS AND APPARATUS FOR LAYING RUBBER MATERIALS FOR TIRE-CONSTITUTIONAL MEMBERS

BACKGROUND OF THE INVENTION

1. Field of the Invention

This invention relates to a process and an apparatus for laying rubber materials for tire-constitutional members around a rotating support, and more particularly to a process and an apparatus for laying rubber materials for the tire-constitutional members in a high accuracy and a high efficiency.

2. Description of Related Art

The pneumatic tire (hereinafter referred to as a tire) comprises reinforcing members such as rubberized cords and the like, and various rubber members. Therefore, a green tire is provided by laying reinforcing materials such as uncured rubber materials, uncured rubberized cord materials and the like at a shaping step prior to vulcanization of the green tire.

Recently, properties required for the tire tend to become more highly developed and be more diversified and hence the tire-constructional members are more diversified in accordance with this tendency. As a result, it is obliged to make the shaping step more complicated. Therefore, it is difficult to completely automate the shaping step and a hand working is yet required in the present circumstances. However, when the hand working is used, the higher improvement of the shaping efficiency is not expected and the laying accuracy of various materials is damaged. Particularly, the laying accuracy depends the quality of the tire, so that it is strongly demanded to increase the laying accuracy together with the increase of the shaping efficiency.

In order to satisfy such demands, JP-B-7-94155 proposes a method and apparatus wherein an outlet orifice of a volumetric extruder is located near to a position for feeding a rubber material onto a rotating support and the rubber material is directly extruded on the support through the outlet orifice from the volumetric extruder.

In the method and apparatus proposed in JP-B-7-94155, it is difficult to maintain the sectional shape of a continuous extruded rubber material during the laying due to the surging or so-called change of extrusion amount inherent to the extruder when the extruded rubber material has particularly a thin gauge. And also, the following problem is caused because various rubber materials are laid on the rotating support.

Since the viscoelasticity differs in accordance with the kind of the rubber material, the die swell quantity is also changed. For this end, it is required to take means for controlling the sectional shape of the rubber material to be laid. This is attained by replacing the die with another die, or by changing the die form through some methods. In any case, such a control means takes a significant time for coping with the different die swell quantities, and also there is caused a problem of lowering the laying productivity.

SUMMARY OF THE INVENTION

It is, therefore, an object of the invention to provide a process for laying rubber materials for tire-constitutional members wherein an uncured rubber material constituting each tire-constitutional member can be laid on a rotating support in a high accuracy and a high efficiency.

It is another object of the invention to provide an apparatus capable of advantageously realizing the above process.

According to a first aspect of the invention, there is the provision of a process for laying an uncured rubber material for a tire-constitutional member on a rotating support, which comprises driving a pair of rollers located near to a surface of a radially outer portion of the rotating support in opposite directions so as to serve a gap defined between the pair of the rollers as a roller die, feeding a rubber material having a gauge larger than the gap to the roller die, and laying the rubber material fed through the roller die to the rotating support.

The term "rotating support" used herein means a metal core removably fitted to a shaft provided with a driving source, or a composite of the metal core and a material such as rubber material for tire-constitutional member or rubberized reinforcing cord material, a part of which being laid on a radially outer portion of the metal core.

In a preferable embodiment of the first aspect of the invention, the gap of the roller die is freely adjusted so as to adjust a sectional shape of the rubber material fed through the roller die.

In another preferable embodiment of the first aspect of the invention, an outlet port of a volumetric extruder is located in the vicinity of the roller die opposed to the vicinity of the surface of the radially outer portion of the rotating support and the rubber material is extruded from the volumetric extruder to the roller die. Moreover, a rubber strip of a high temperature may directly be fed to the roller die through hot rolls, calendar rolls or the like in stead of the volumetric extruder.

In the other preferable embodiment of the first aspect of the invention, the pair of rollers are moved around the radially outer portion of the rotating support from one side toward the other side. Thus, the rubber material is toroidally formed on the radially outer portion of the rotating support.

In a still further preferable embodiment of the first aspect of the invention, the rubber material fed through the roller die is guided by either one of the pair of rollers toward the surface of the radially outer portion of the rotating support.

In order to ensure the accuracy of the rubber material to be laid, it is favorable that a surface peripheral speed of the radially outer portion of the rotating support is made approximately equal to an outer peripheral surface speed of the roller during the laying of the rubber material onto the rotating support.

In order to surely adhere a top portion of the rubber material to the rotating support, it is favorable that the surface peripheral speed of the radially outer portion of the rotating support in the laying of a starting point of the rubber material onto the rotating support is 1.0–1.05 times the outer peripheral surface speed of the roller.

In case of using the volumetric extruder, it is favorable that the surface peripheral speed of the radially outer portion of the rotating support and the outer peripheral surface speed of the roller are made higher than an extruding rate of the rubber material from the volumetric extruder during the laying of the rubber material onto the rotating support.

In case of using the volumetric extruder, it is favorable to use a gear pump in the volumetric extruder. Thus, the surging phenomenon can be solved practically.

According to a second aspect of the invention, there is the provision of an apparatus for laying rubber materials for tire-constitutional members around a rotating support, comprising a volumetric extruder feeding an uncured rubber material onto the rotating support, a pair of rollers located near to an outlet port of the volumetric extruder and near to a radially outer portion of the rotating support and driven in opposite directions to each other, and a gap defined between the pair of the rollers and serving as a die for the rubber material to be laid.

In a preferable embodiment of the second aspect of the invention, the pair of the rollers are provided with a gap adjusting mechanism adjusting the gap of the die.

In another preferable embodiment of the second aspect of the invention, a gear pump is used in the volumetric extruder.

In the other preferable embodiment of the second aspect of the invention, the apparatus comprises a turning table fixedly supporting the volumetric extruder and the pair of the rollers, and the turning table is provided with a driving means for changing relative positions of the pair of the rollers and the volumetric extruder to a surface of the radially outer portion of the rotating support.

In a further preferable embodiment of the second aspect of the invention, the volumetric extruder is provided with a screw extruder connected to a side of an inlet port thereof, and the turning table fixedly supports the volumetric extruder through the screw extruder.

In a still further preferable embodiment of the second aspect of the invention, the turning table is provided on its lower side with a horizontally moving table, and the horizontally moving table comprises a mechanism freely moving in parallel to a rotating axial line of the rotating support and a mechanism freely moving in a direction perpendicular to the rotating axial line. Thus, it is possible to automatically move the pair of the rollers along an outer periphery of the rotating support having a toroidal shape at its outer profile section by these two tables.

DESCRIPTION OF THE DRAWINGS

The invention will be described with reference to the following drawings, wherein.

DESCRIPTION OF PREFERRED EMBODIMENTS

At first, the invention is described with respect to the apparatus for laying the rubber material.

Figure 1:
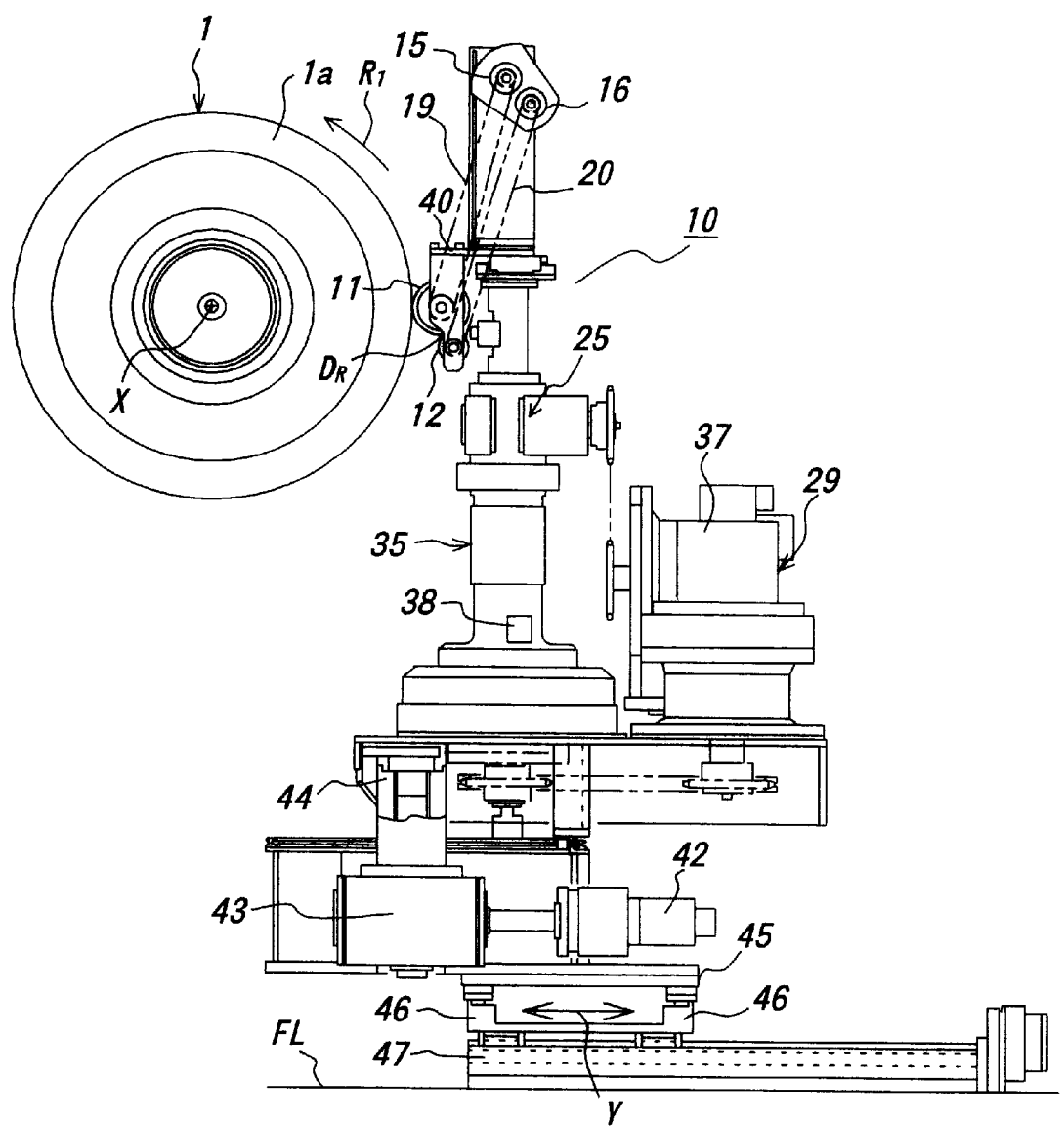
FIG. 1 is a side view of a rotating support and an apparatus for laying rubber materials according to the invention.
Figure 2:
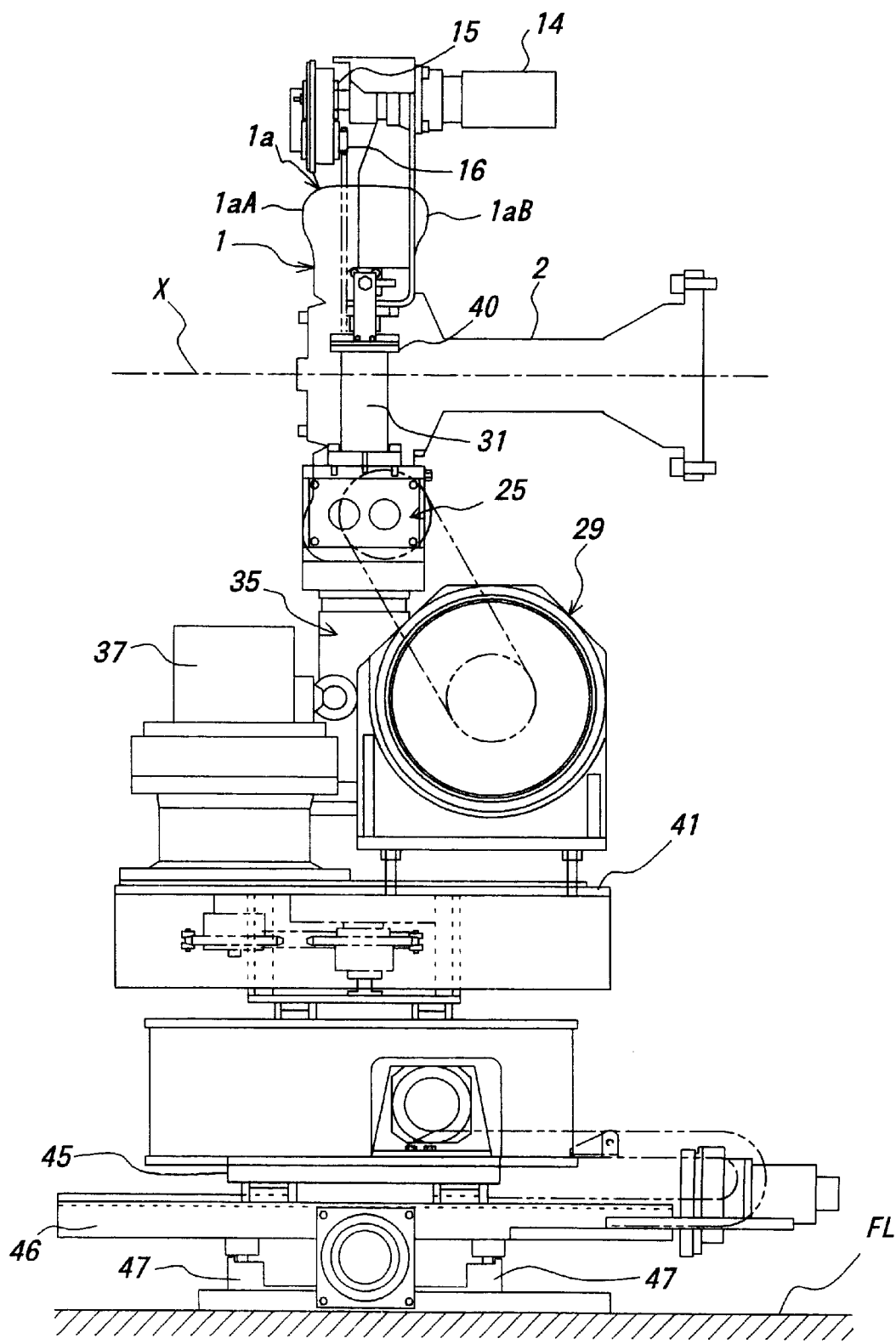
FIG. 2 is a front view of the rotating support and a rear view of the apparatus for laying rubber materials according to the invention.
Figure 3:
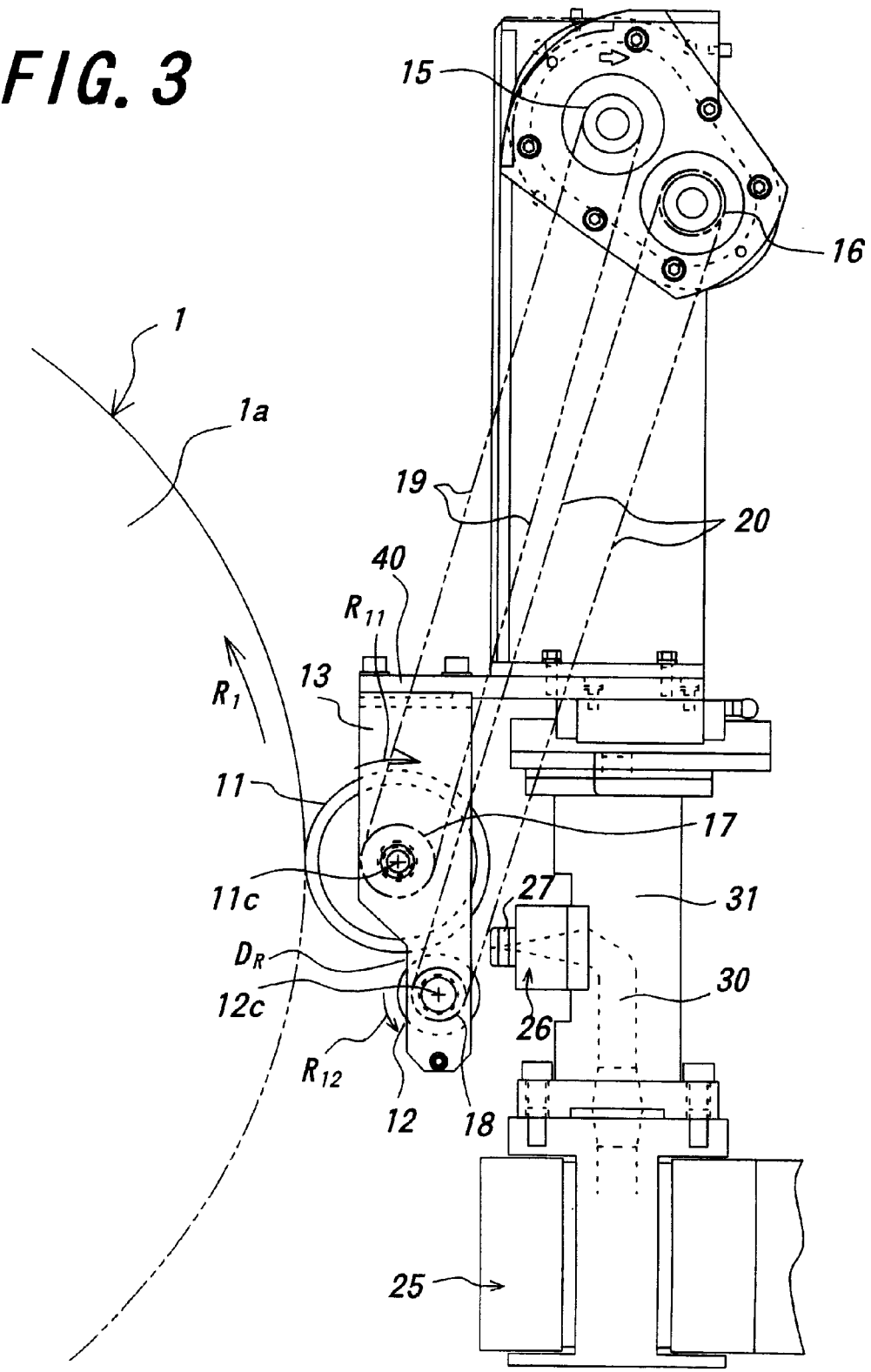
FIG. 3 is an enlarged side view illustrating a pair of rollers and their driving portion according to the invention.
Figure 4:
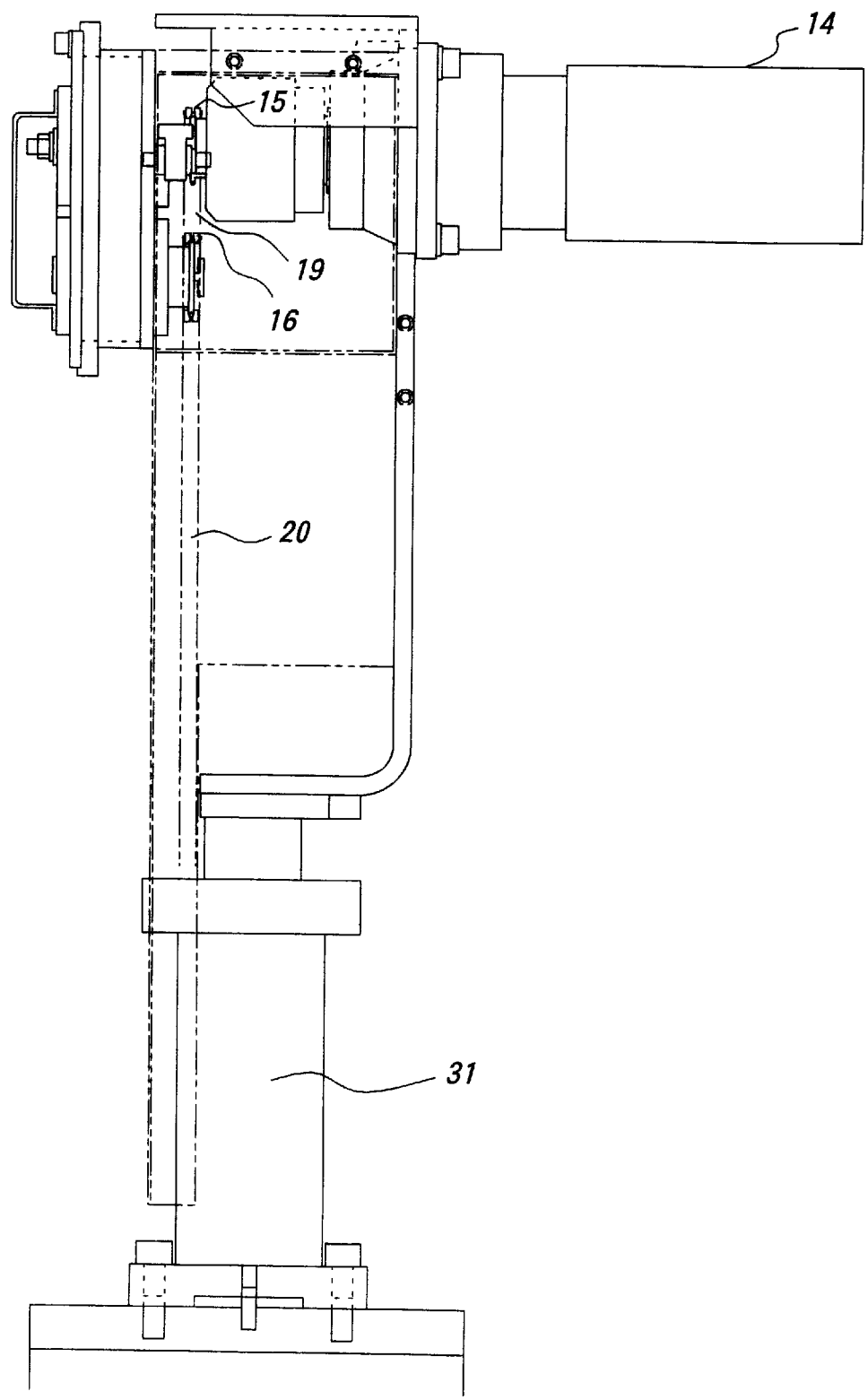
FIG. 4 is an enlarged rear view of the roller driving portion shown in FIG. 3.

In FIGS. 1–3, a rotating support 1 indicates a core 1a as a radially outer portion thereof, or a state of laying an uncured rubber material constituting tire member (hereinafter referred to as rubber material) and an uncured rubberized cord material around the core 1a. In this case, the rubber material laying apparatus is limited to an apparatus for laying the rubber material. FIGS. 1–3 show only the core 1a prior to the laying of the rubber material.

The rotating support 1 is supported by a rotating shaft 2 connected to a driving means (not shown) and can be rotated in both forward and backward directions. In the illustrated embodiment, a rotating direction $R_1$ is counterclockwise. The rubber material is laid on a radially outer portion of the core 1a of the rotating support 1 (see FIG. 2). The portion to be laid with the rubber material has a toroidal shape in its surface. Therefore, the portion to be laid with the rubber material is rewritten as a toroidal portion 1a below. Moreover, the core 1a is removably fitted to a rotating shaft 2 having a center axial line X and has a segment structure that plural segments constituting the core can be assembled or dissembled.

The laying device 10 comprises a pair of rollers 11, 12 located near to a surface of the toroidal portion 1a of the rotating support 1 in the laying of the rubber material. At least surface-side portion of each of the upper and lower rollers 11, 12 in the illustrated embodiment is made of a metal indicating a non-tackiness and having an uneven surface such as satin-finished surface or the like, a metal covered with a non-tacky rubber, or a metal having a mirror-finished surface and indicating a tackiness. At least the upper roller 11 is located near to the surface of the toroidal portion 1a. Each of the rollers 11, 12 is rotatably supported by a bracket 13. And also, each of the rollers 11, 12 is provided with a driving means for rotating the roller. The structure of this driving means is not critical.

Referring to FIGS. 1–6, the driving means of the illustrated embodi-ment comprises a motor 14, two sprockets 15, 16 disposed on a top portion of a shaft of the motor, two sprockets 17, 18 each fixed to respective rollers 11, 12, and roller chains or silent chains 19, 20 each connecting the sprockets 15, 16 to the sprockets 17, 18. The rotating directions of the sprockets 15, 16 are opposite to each other and hence the rotating directions of the rollers 11, 12 become also opposite to each other. In the illustrated embodiment, the rotating direction $R_{11}$, of the upper roller 11 is clockwise, and the rotating direction $R_{12}$, of the lower roller 12 is counterclockwise.

A gap $D_R$ is defined between the rollers 11, 12 on a hypothetical line segment connecting rotating central axis lines 11c, 12c to each other. Such a gap $D_R$ serves as a roller die as mentioned later. The gap $D_R$ has a given constant size in the widthwise direction of the rollers 11, 12 and can automatically be adjusted within a range of 0.3–1.2 mm by means of a device (not shown).

For this end, the upper roller 11 can preferably be moved along a guide (not shown) formed in the bracket 13 in up and down directions. On the other hand, the lower roller 12 is fixed to the bracket 13. Moreover, the lower roller 12 may be used as a moving roller. Moreover, the hypothetical line segment connecting the rotating central axis lines 11c, 12c to each other is favorable to be inclined with respect to a vertical plane passing through the rotating center of the core. Although the inclining direction in the illustrated embodiment is upwards to the left, it may be either left or right.

The roller die $D_R$ has a given width corresponding to the width of the rubber material just before the laying onto the rotating support 1, e.g. a width of 10–20 mm. And also, the widths of the rollers 11, 12 are the same as the roller die $D_R$, wherein the widthwise centers of the rollers 11, 12 are coincident with each other. A continuous ribbon-shaped rubber material adjusted to given width and gauge at a high temperature state is fed to the roller die $D_R$.

The feeding of the continuous ribbon-shaped rubber material is carried out through a die 27 of an extruding head 26 in a volumetric extruder 25. An opening portion of the die 27 is located near to the roller die $D_R$ opposite to the neighborhood of the surface of the toroidal portion 1a of the rotating support 1. The die 27 is required to have such a sectional shape of the opening portion that the thickness of the continuous ribbon-shaped rubber material extruded through the die 27 is higher than the gap height of the roller die $D_r$. Moreover, the thick ribbon-shaped rubber material having the above sectional shape can directly be fed to the roller die $D_R$ through another calendar rollers.

Figure 5:
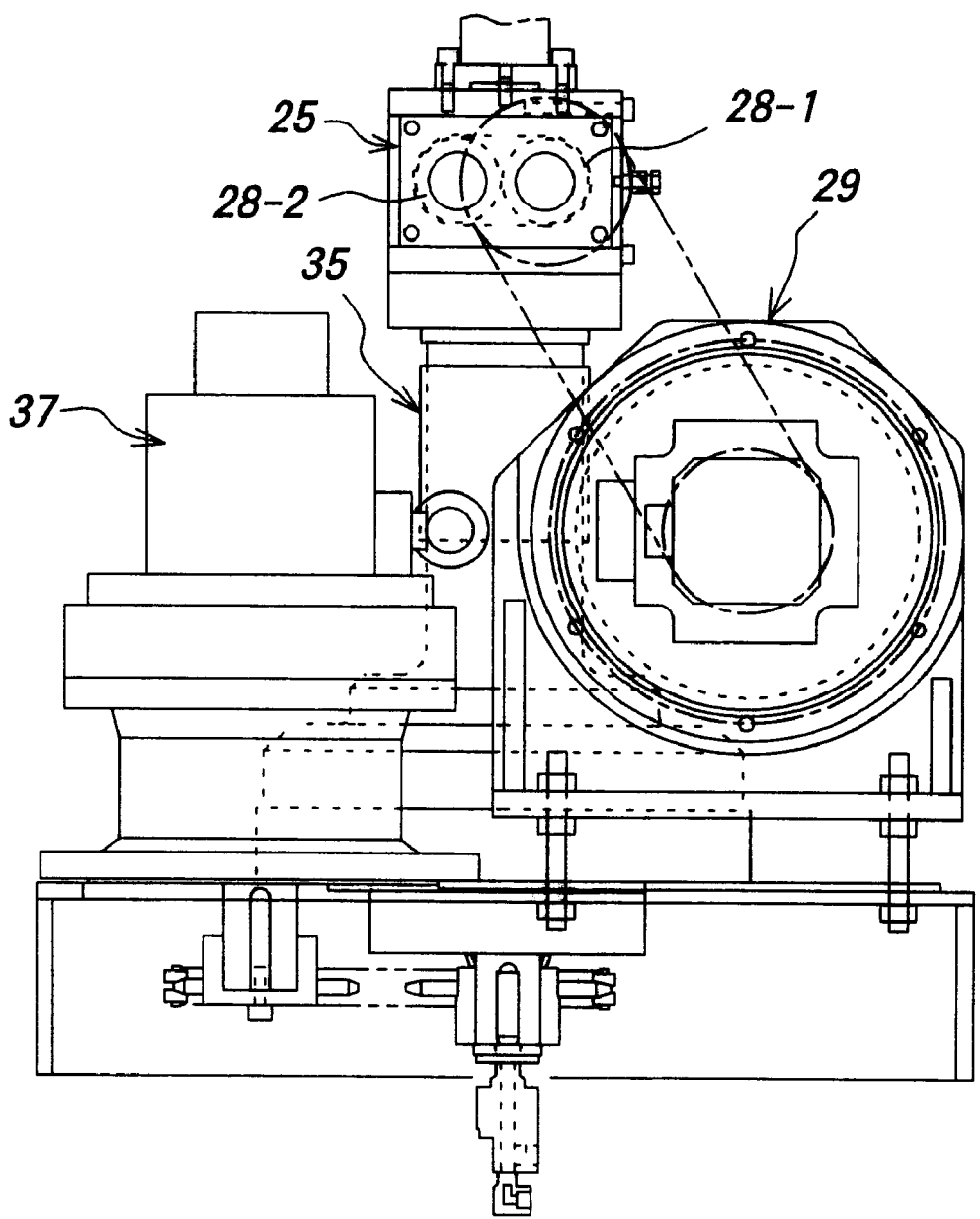
FIG. 5 is a rear view of a volumetric extruder and a screw extruder according to the invention.
Figure 6:
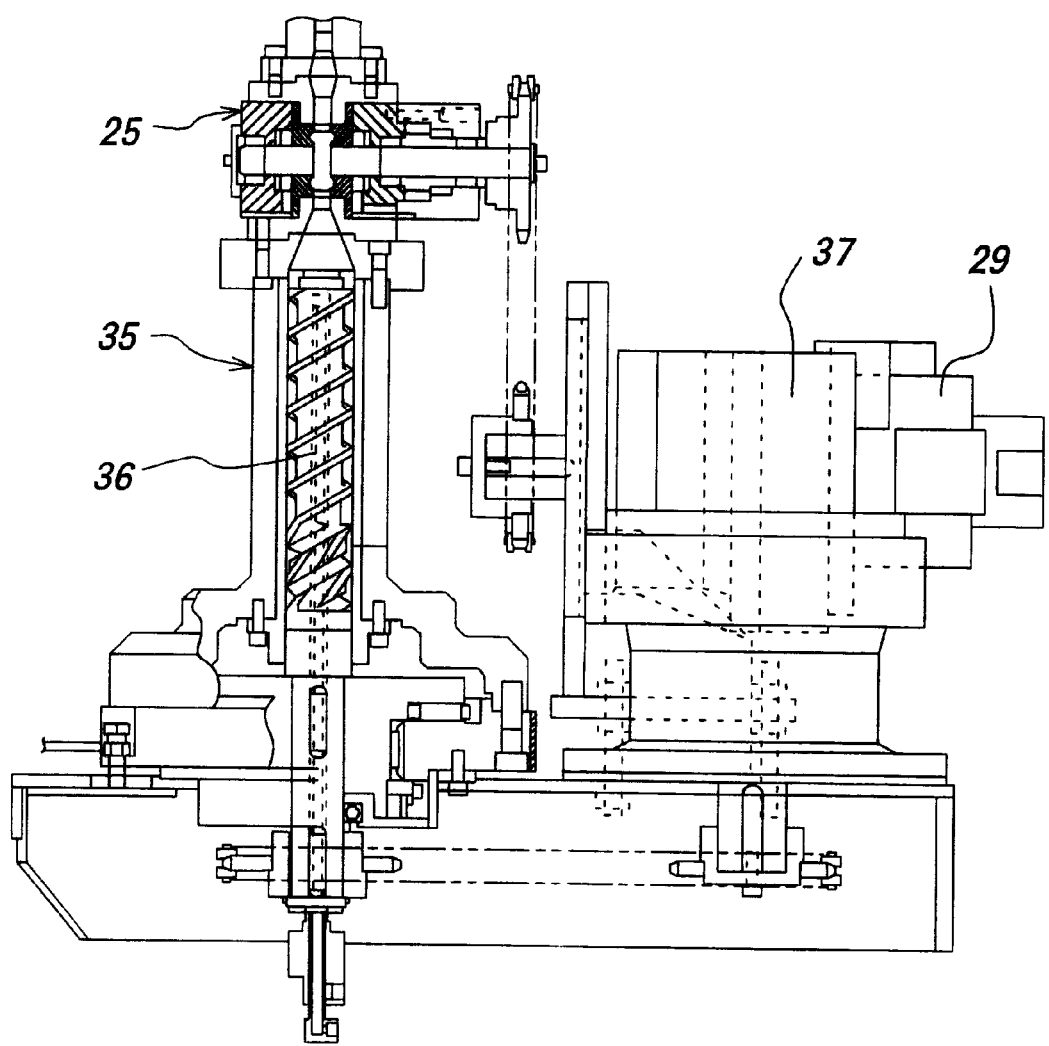
FIG. 6 is a side view partly shown in section of the volumetric extruder and the screw extruder according to the invention.

As the volumetric extruder 25, any types can be adopted, but a gear pump is advantageously adaptable in the invention. A gear pump 25 shown in FIGS. 2 and 5 is external type. In this case, a lower part of the gear pump 25 is an inlet of the rubber material and an upper part thereof is an outlet of the rubber material, and one of two gears 28-1, 28-2 is driven by a motor 29. Moreover, an internal gear pump may be used.

In FIG. 3 is shown a passage 30 of the rubber material ranging from the outlet of the gear pump 25 through the extruding head 26 to the opening portion of the die 27 by dotted lines. The passage 30 is bent from vertical direction to horizontal direction at the position of the extruding head 26. The extruding head 26 and the die 27 are removably fitted to a member 31 forming the passage 30.

To the inlet side of the gear pump 25 is connected an extruding outlet side of the usual screw extruder 35. A screw 36 of the extruder 35 is rotated by a motor 37. A rubber material is fed from an inlet port 38 for the rubber material into the screw extruder 35 and kneaded therein to form a high temperature rubber material having an increased fluidity, which is fed into the gear pump 25. Moreover, a high temperature rod-shaped rubber material can directly be fed to the gear pump 25 from another equipment instead of the screw extruder 35.

The gear pump 25 largely improves the surging phenomenon (change of extrusion amount) in close cooperation with the screw extruder 35, or serves to uniformize the change of the sectional area in the longitudinal direction of the rod-shaped rubber material when such a rod-shaped rubber material is fed from the other equipment. In any case, the gear pump 25 can feed the rubber material having a sectional shape of a high accuracy in the longitudinal extrusion direction to the roller die $D_R$.

Referring to FIGS. 1–3, the bracket 13 fitted with the pair of the rollers 11, 12 and an upper end portion of the member 31 forming the passage 30 and fitted with the extruding head 26 of the gear pump 25 are fixed to the same plate 40, whereby the pair of the rollers 11, 12 and the die 27 are integrally united with each other through the plate 40. On the other hand, the screw extruder 35 is fixed to a turn table 41. Therefore, the pair of the rollers 11, 12, gear pump 25, extruding head 26 and die 27 are supported by the turn table 41 through the screw extruder 35.

The turn table 41 is provided with a driving means. This driving means comprises a motor 42, cross gear or hyperboloidal gear (not shown), turning shaft 43 fixed to one of gear members, and a bearing 44 located above a housing for the gear and supporting the turning shaft 43. As the cross gear, a bevel gear or a cross face gear is adaptable, and as the hyperboloidal gear, a worm gear or a hypoid gear is adaptable.

In any case, a gear turning the turning shaft 43 having an axial line perpendicular to a horizontal rotating axial line of the motor 42 may be used. In the illustrated embodiment, the worm gear is used, wherein a worm is connected to a rotating axis of the motor 42 and a worm wheel is fixed to the turning shaft 43. An upper end of the turning table 43 is fixed to the turn table 41.

The turn table 41 is provided on its lower part with a horizontally moving table 45. The horizontally moving table 45 is slidably engaged with a first base 46 to freely move in a direction parallel to a central axis line X of the rotating support 1. And also, the first base 46 is slidably engaged with a second base 47 fixed to a floor surface FL to freely move in a direction Y perpendicular to the central axis line X of the rotating support 1.

As mentioned above, the horizontally moving table 45 has a mechanism of moving with the first base 46 in parallel to the central axis line X of the rotating support 1. And also, the horizontally moving table 45 has a mechanism of moving with the second base 47 through the first base 46 in a direction perpendicular to the central axis line X of the rotating support 1. The turn table 41 conducts the movement in the above two directions through the turning shaft 43.

Furthermore, the laying apparatus 10 is provided with an automatic control mechanism (not shown) for controlling each driving means, whereby the laying operation of the rubber material is fully and automatically carried out. The laying apparatus 10 does not use special parts and is simple in the structure, and the cost is cheap and the reliability is rich and the high accuracy is developed.

The method of laying the rubber material will be described with reference to the laying apparatus below.

The rotating support 1 is set in the vicinity of the rollers 11, 12 in the laying apparatus 10. In this case, the upper roller 11 having a larger diameter is approached to the surface of the toroidal portion 1a. Thereafter, the rotating support 1 is rotated to actuate the pair of the rollers 11, 12, gear pump 25 and screw extruder 35, respectively.

A rubber material is continuously or discontinuously fed from the inlet port 38 for the rubber material and kneaded in the screw extruder 35, which is fed into the gear pump 25. The rubber material extruded from the gear pump 35 passes through the passage 30 and is extruded from the die 27 through the extruding head 26 as a relatively thick ribbon-shaped rubber material. The thus extruded ribbon-shaped rubber material is fed to the roller die $D_R$ located near to the opening portion of the die 27.

The position of the ribbon-shaped rubber material fed from the opening portion of the die 27 is the neighborhood of the roller die $D_R$ located opposite to the surface of the toroidal portion 1a. In this case, the ribbon-shaped rubber material fed to the roller die $D_R$ has a gauge exceeding a gap of the roller die $D_R$. As a result, a relatively thin ribbon-shaped rubber material drawn and adjusted to a given sectional shape by the roller die $D_R$ is laid on the rotating toroidal portion 1a.

The continuous ribbon-shaped rubber material passed through the roller die $D_R$ does not develop the conventionally observed die swell phenomenon, so that the influence by the change of viscoelasticity is not caused. Even if the material of rubber changes or the viscoelasticity changes, the continuous ribbon-shaped rubber material passed through the roller die $D_R$ holds the same gauge as the gap $D_R$. Therefore, the laying operation has a considerably high efficiency.

And also, the gauge distribution of the continuous ribbon-shaped rubber material in the longitudinal and widthwise directions is always uniform and has a high accuracy. This is due to the fact that the rollers 11, 12 are rotated in opposite directions $R_{11}$, $R_{12}$ and located in the vicinity of the toroidal portion 1a to shorten a distance between the roller die $D_R$ and the laying position to thereby cause no change of the shape in the ribbon-shaped rubber material. Furthermore, the use of the roller die DR can freely control the rubber material to be laid to a given sectional shape including a very thin gauge while maintaining the gauge at a high accuracy. They contributes to improve the quality of the tire.

In this case, an outer surface peripheral speed $V_1$ (m/min) of the toroidal portion 1a, an outer surface peripheral speed $V_2$ (m/min) of the upper roller 11, an outer surface peripheral speed $V_3$ (m/min) of the lower roller 12 and an extrusion rate $V_4$ (m/min) of the die 27 satisfy the following relationships (1)~(3).

(1) $V_1=V_2>V_4$ and $V_3>V_4$ (2) $V_2=V_3$ except for the following state. When the surface of the lower roller 12 is tacky and the starting end portion of the ribbon-shaped rubber material passed through the roller die $D_R$ is laid onto the non-tacky core 1a, $V_2>V_3$ is adaptable at an initial state.

(3) At an initial stage of laying a starting end portion of the ribbon-shaped rubber material passed through the roller die DR onto the non-tacky toroidal portion 1a, $V_1=(1.01~1.05)\times V_2$. That is, the speed $V_1$ is increased by 1–5% as compared with the speed $V_2$. Thus, the ribbon-shaped rubber material can surely and smoothly be laid onto the surface of the toroidal portion 1a. However, when the surface of the toroidal portion 1a has a tackiness or when a tacky material (including rubberized cord material) is previously laid on the toroidal portion 1a, $V_1=V_2$. That is, the speed $V_1$ is approximately equal to the speed $V_2$.

As seen from the relation (1) of $V_1=V_2>V_4$ and $V_3>V_4$, the ribbon-shaped rubber material passed through the roller die $D_R$ is unchangeable in the width but has a gauge of $V_4/V_2$ times as compared with the sectional shape (super flat rectangle) of the thick ribbon-shaped rubber material extruded from the die 27. In other words, the speed ratio $V_4/V_2$ is set so as to obtain a desired gauge without changing the width size.

For example, when the speed ratio $V_4/V_2$ is set to 0.5, the thick ribbon-shaped rubber material extruded from the die 27 and having a width of 15 mm and a gauge of 1.0 mm is rendered into a continuous ribbonshaped rubber material having a width of 15 mm and a gauge of 0.5 mm after the pass through the roller die $D_R$. As see from this example, the continuous ribbon-shaped rubber material is narrow in the width.

In the illustrated embodiment, the gap size of the roller die DR is adjusted by working an automatic control device for the gap $D_R$(not shown) to move the upper roller 11 in up and down directions. This corresponds to material change of the rubber materials having different die swells or gauge change required. This correspondence is easily conducted in a shorter time as compared with the die change of the conventional extruder.

And also, the turn table 41 is turned by the automatic control means (not shown) to move the horizontally moving table 45 in a direction parallel to the axis line X and Y direction. By these turning and orizontal movement, the pair of the rollers 11, 12 are moved around the rotating toroidal portion 1a as the radially outer portion of the rotating support 1 from one side 1aA of the toroidal portion 1a toward the other side 1aB thereof (see FIG. 2). By this movement, the narrow-width, continuous ribbon-shaped rubber material is successively laid on the surface of the rotating toroidal portion 1a having a complicated curved surface to form a finished rubber material aggregate.

In the laying of the ribbon-shaped rubber material onto the toroidal portion 1a, either one of the rollers 11, 12 serves as a guide roller guiding the ribbon-shaped rubber material onto the toroidal portion 1a. In the illustrated embodiment, the upper roller 12 serves as the guide roller. Thus, the improvement of the laying accuracy and the simplification of the apparatus can simultaneously attained.

As to the above method of laying the rubber material, a pair of the laying apparatuses 10 are arranged on both sides of the rotating support 1, whereby the rubber material can be simultaneously laid on the surface of the rotating toroidal portion 1a. Even when using the single laying apparatus 10, the working efficiency is largely improved as compared with the conventional laying method, but when using the pair of the laying apparatuses 10, the working efficiency can considerably improved.

According to the invention, a gap defined between a pair of rotating rollers is used as a roller die, so that various rubber materials constituting the tire-constructional members can be laid onto the rotating support in a high accuracy and a considerably higher efficiency irrespectively of the die swell change in the extruder. Furthermore, the apparatus carrying out the above laying method is cheap and rich in the reliability.

What is claimed is:

1. A process for laying an uncured rubber material for a tire-constitutional member on a rotating support, which comprises driving a pair of rollers located immediately adjacent to a surface of a radially outer portion of the rotating support in opposite directions so as to form a gap defined between the pair of rollers as a roller die, feeding a rubber material having a gauge larger than the gap to the roller die, and laying the rubber material fed though the roller die directly to the rotating support, either one of the pair of rollers guiding the rubber material onto the rotating support.

2. A process according to claim 1, wherein the gap of the roller die is freely adjustable and freely adjusting the gap so as to adjust a sectional shape of the rubber material fed through the roller die.

3. A process according to claim 1, wherein an outlet port of a volumetric extruder is located in the vicinity of the roller die opposed to the vicinity of the surface of the radially outer portion of the rotating support and the rubber material is extruded from the volumetric extruder to the roller die.

4. A process according to claim 1, wherein the pair of rollers are moved around the radially outer portion of the rotating support from one side toward the other side.

5. A process according to claim 1, wherein the rubber material fed through the roller die is guided by either one of the pair of rollers toward the surface of the radially outer portion of the rotating support.

6. A process according to claim 1, wherein a surface peripheral speed of the radially outer portion of the rotating support is made approximately equal to an outer peripheral surface speed of the roller during the laying of the rubber material onto the rotating support.

7. A process according to claim 6, wherein the surface peripheral speed of the radially outer portion of the rotating support in the laying of a starting point of the rubber material onto the rotating support is 1.0–1.05 times the outer peripheral surface speed of the roller.

8. A process according to claim 3, wherein the surface peripheral speed of the radially outer portion of the rotating support and the outer peripheral surface speed of the roller are made higher than an extruding rate of the rubber material from the volumetric extruder during the laying of the rubber material onto the rotating support.

9. A process according to claim 3, wherein a gear pump is used as the volumetric extruder.

* * * * *